(12) United States Patent
Miyamoto et al.

(10) Patent No.: US 11,821,667 B2
(45) Date of Patent: Nov. 21, 2023

(54) COOLING APPARATUS AND COOLING METHOD

(71) Applicant: NEC Corporation, Tokyo (JP)

(72) Inventors: Yoshinori Miyamoto, Tokyo (JP); Minoru Yoshikawa, Tokyo (JP); Masaki Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 17/520,901

(22) Filed: Nov. 8, 2021

(65) Prior Publication Data

US 2022/0146167 A1 May 12, 2022

(30) Foreign Application Priority Data

Nov. 9, 2020 (JP) .................. 2020-186529

(51) Int. Cl.
*F25B 49/02* (2006.01)
*F25B 39/00* (2006.01)
*F25B 43/04* (2006.01)

(52) U.S. Cl.
CPC .............. *F25B 49/02* (2013.01); *F25B 39/00* (2013.01); *F25B 43/043* (2013.01); *F25B 2400/16* (2013.01); *F25B 2400/24* (2013.01); *F25B 2600/05* (2013.01); *F25B 2600/2513* (2013.01)

(58) Field of Classification Search
CPC ........ F25B 49/02; F25B 39/00; F25B 43/043; F25B 2400/16; F25B 2400/24; F25B 2600/05; F25B 2600/2513
See application file for complete search history.

(56) References Cited

U.S. PATENT DOCUMENTS

| 2,145,692 A | * | 1/1939 | Jones ................... F25B 43/043 |
| | | | 62/118 |
| 2018/0320932 A1 | * | 11/2018 | Cooper ................... F25B 39/00 |

FOREIGN PATENT DOCUMENTS

| CN | 103299141 A | * | 9/2013 | ............ F25B 49/005 |
| JP | S60-092846 U | | 6/1985 | |
| JP | H09-292168 A | | 11/1997 | |
| JP | 2007-139257 A | | 6/2007 | |

(Continued)

OTHER PUBLICATIONS

Pdf is translation of foreign referecne CN103299141A (Year: 2013).*

(Continued)

*Primary Examiner* — Len Tran
*Assistant Examiner* — Kamran Tavakoldavani

(57) ABSTRACT

A cooling apparatus includes a heat receiver that evaporates a low pressure heat transfer medium. The apparatus includes a compressor that compresses the evaporated heat transfer medium in a gas phase state, and a condenser that condenses the compressed heat transfer medium. The apparatus includes a receiver tank that receives and stores at least one of the heat transfer medium from any place in a flow path of the medium in the gas phase state that returns the medium to the heat receiver and the condensed medium in a liquid phase state. The apparatus includes an air storage tank that air separated from the heat transfer medium. The apparatus includes a liquid level controller that controls a liquid level in the receiver tank such that the heat transfer medium is stored in the receiver tank at a predetermined liquid level height.

9 Claims, 4 Drawing Sheets

(56) References Cited

FOREIGN PATENT DOCUMENTS

JP       2007139257 A  *  6/2007
JP       2016-121865 A    7/2016

OTHER PUBLICATIONS

Pdf is translation of foreign reference JP2007139257A (Year: 2007).*
Pdf is original document of foreign reference JP2007139257A (Year: 2007).*

* cited by examiner

COOLING APPARATUS AND COOLING METHOD

CROSS-REFERENCE TO RELATED APPLICATION

This application is based upon and claims the benefit of priority from Japanese Patent Application No. 2020-186529, filed Nov. 9, 2020, the content of which is incorporated herein its entirety by reference.

TECHNICAL FIELD

The present invention relates to a cooling apparatus and a cooling method.

BACKGROUND ART

As a technology related to cooling of heat generating elements such as semiconductors used in electronic devices, there is a technology that utilizes a refrigeration cycle including a compressor, an evaporator, a condenser, and an expansion valve. It is known that when air is mixed with a heat transfer medium that is circulating in the refrigeration cycle, the performance of a flow rate system decreases because the flow rate of a heat transfer medium that can actually perform heat exchange is reduced, or the heat conduction efficiency decreases due to the presence of air in the heat transfer medium.

As a technology related to countermeasures against the mixing in of air, there are technologies disclosed in Japanese Unexamined Patent Application, First Publication No. H09-292168 (hereinafter referred to as "Patent Document 1"), and Japanese Unexamined Utility Model Application, First Publication No. S60-92846 (hereinafter referred to as "Patent Document 2").

Patent Document 1 discloses a construction method of a refrigeration system that allows evacuation such that air is prevented from remaining in a pipeline. With this construction method, upon construction of the refrigeration system, the inside of an entire pipeline can be evacuated to remove the air in the pipeline.

In addition, the air may be mixed with a heat transfer medium in the pipeline not only during construction of the refrigeration system but also after starting operation thereof. A technology as disclosed in Patent Document 2 is known in relation to a technology for separating out air mixed in after starting the operation from a heat transfer medium.

As disclosed in FIG. 2 of Patent Document 2, a boiling and cooling apparatus has a configuration in which an air storage tank is installed above a condenser in which a heat-dissipated heat transfer medium condenses, and the air mixed with the heat transfer medium is collected in the air storage tank. In addition, this apparatus has a configuration of detecting that the temperature of the heat transfer medium has decreased due to accumulation of air in the air storage tank, and notifying a user of a decrease in cooling capability due to the accumulation of air using an alarm, or operating a protection circuit for a target which is being cooled.

As a heat transfer medium used in a refrigeration cycle, a low pressure heat transfer medium, which can be said to have a small environmental load, (e.g., a fluorine compound gas having a vapor pressure of equal to or smaller than 1 MPa during storage and transportation in a normal environment) may be used. In a refrigeration cycle using a low pressure heat transfer medium, it is inevitable that a diameter of a pipeline that constitutes the refrigeration cycle will have to be increased because a heat quantity that a low pressure heat transfer medium can transfer per unit volume is small. Furthermore, there may be places in the pipeline where the low pressure heat transfer medium is at less than or equal to atmospheric pressure. In a place at less than or equal to atmospheric pressure, an internal pressure is low, and thus atmospheric air may infiltrate the low pressure heat transfer medium from small gaps such as a joint portion in the pipeline. In particular, in a large diameter pipeline with a large surface which is to be sealed at a joint portion, it is inevitable that the likelihood of atmospheric air mixing with the low pressure heat transfer medium will be high.

However, Patent Document 1 discloses removal of air by means of evacuation during construction of the refrigeration system, and does not disclose a configuration that discharges air mixed in the pipeline after the starting operation.

In addition, Patent Document 2 merely discloses storage of the air in the upper portion of the condenser, and does not disclose a technology of eliminating the air sucked in various places in a flow path of the low pressure heat transfer medium in the refrigeration system.

In addition, as related technologies, there are Japanese Unexamined Patent Application, First Publication No. 2016-121865 (hereinafter referred to as "Patent Document 3") and Japanese Unexamined Patent Application, First Publication No. 2007-139257 (hereinafter referred to as "Patent Document 4").

Patent Document 3 relates to a technology of preventing a cooling performance from deteriorating due to the accumulation of air which has leaked into the cooling apparatus in or near the radiating unit. That is, Patent Document 3 only discloses detection of the mixing of air with the heat transfer medium. Like Patent Document 2, Patent Document 3 does not disclose a specific configuration required to maintain cooling efficiency by eliminating the air sucked in various places in a flow path of a low pressure heat transfer medium in a refrigeration system.

In addition, Patent Document 4 discloses a technology of maintaining a liquid level in a receiver tank in front of a heat exchanger to a predetermined level or more in order to ensure that the low pressure heat transfer medium supplied to a heat exchanger (an evaporator) is a liquid phase state, but does not disclose a specific configuration required to eliminate the air which has been mixed in in the refrigeration cycle.

SUMMARY

An example object of the present invention is to surely eliminating air mixed in a low pressure heat transfer medium in a pipe conduit through which the low pressure heat transfer medium is flowing.

In order to solve the above-mentioned problems, a first example aspect of the present invention is a cooling apparatus that includes: a heat receiver configured to evaporate a low pressure heat transfer medium; a compressor configured to compress the low pressure heat transfer medium in a gas phase state evaporated by the heat receiver; a condenser configured to condense the low pressure heat transfer medium compressed by the compressor; a receiver tank configured to receive and store at least one of the low pressure heat transfer medium from any place in a flow path of the low pressure heat transfer medium in the gas phase state and the low pressure heat transfer medium in a liquid phase state condensed by the condenser, the flow path being configured to return the low pressure heat transfer medium from the receiver tank to the heat receiver; an air storage tank configured to introduce and store air separated from the low pressure heat transfer medium in the receiver tank; and a liquid level controller configured to control a liquid level in the receiver tank such that the low pressure heat transfer medium in the liquid phase state is stored in the receiver tank at a predetermined liquid level height.

A second example aspect of the present invention is a cooling method that includes: compressing a low pressure heat transfer medium in a gas phase state evaporated by a heat receiver; condensing, by a condenser, the compressed low pressure heat transfer medium; receiving and storing, by a receiver tank, at least one of the low pressure heat transfer medium at any place of a flow path of the low pressure heat transfer medium in the gas phase state and the low pressure heat transfer medium in a liquid phase state condensed by the condenser and separating, by the receiver tank, air from the low pressure heat transfer medium; introducing and storing the separated air; and controlling a liquid level of the low pressure heat transfer medium in the receiver tank so as to be a height at which an inlet of the flow path through which the low pressure heat transfer medium stored in a liquid phase state is returned from the receiver tank to the heat receiver is liquid-sealed.

According to the present invention, in a receiver tank into which a low pressure heat transfer medium flows from a condenser in which the low pressure heat transfer medium becomes a liquid phase state from a gas phase state, air can be separated from the low pressure heat transfer medium.

EXAMPLE EMBODIMENT

Figure 1:
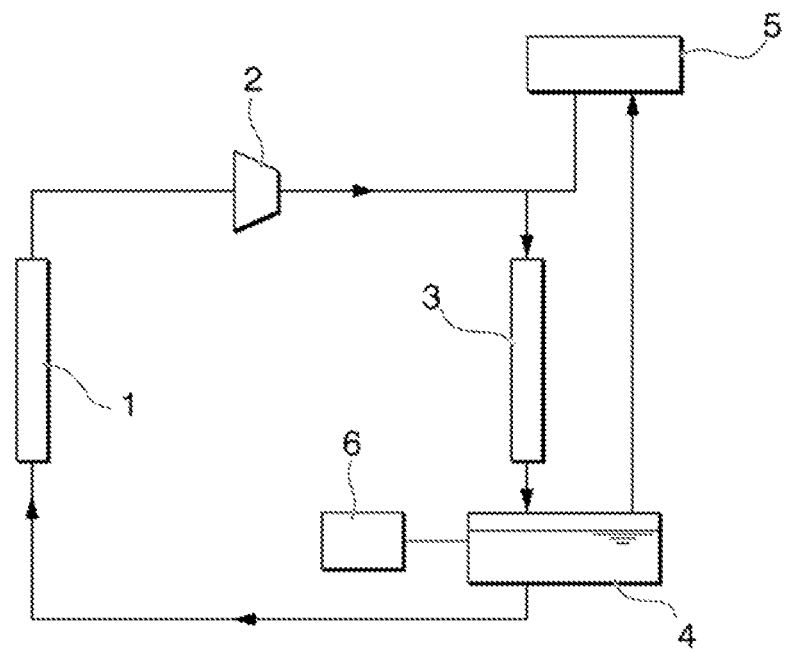
FIG. 1 is a pipeline system diagram showing a route, through which a low pressure heat transfer medium flows, in a cooling apparatus according to an example of a minimum configuration of the present invention.

An example of a minimum configuration of a cooling apparatus according to the present invention will be described with reference to FIG. 1.

The cooling apparatus includes a heat receiving unit (heat receiver) 1 (an evaporator), a compressor 2, a condensation unit (condenser) 3, a receiver tank 4, an air storage tank 5, and a liquid level control unit (liquid level controller) 6. In the cooling apparatus, a low pressure heat transfer medium in a gas phase state evaporated in the heat receiving unit 1 is compressed by the compressor 2, transported to the condensation unit 3, and condensed by the condensation unit 3 to become a liquid phase state. Then, the low pressure heat transfer medium in the liquid phase state flows into the receiver tank 4, and the low pressure heat transfer medium flowing into the receiver tank 4 is returned to the heat receiving unit 1. The receiver tank 4 receives a low pressure heat transfer medium at any one of points in the flow path of the low pressure heat transfer medium in the gas phase state, and/or a low pressure heat transfer medium in the liquid phase state. The air storage tank 5 introduces the air separated from the low pressure heat transfer medium by the receiver tank 4 and stores the separated air.

The liquid level control unit 6 controls the liquid level such that the low pressure heat transfer medium in the liquid phase state is stored at a predetermined liquid level height in the receiver tank 4.

With the above configuration, the low pressure heat transfer medium in the liquid phase state condensed by the condensation unit 3 is received in the receiver tank 4 provided therebelow, and the low pressure heat transfer medium in the liquid phase state is returned to the heat receiving unit 1.

Here, the liquid level of the receiver tank 4 is controlled by the liquid level control unit 6 so as to be a predetermined height, and thus an outlet of the receiver tank 4 to the pipe conduit from the receiver tank 4 toward the heat receiving unit 1 is liquid-sealed by the low pressure heat transfer medium in the liquid phase state. Accordingly, even when the air is mixed with the low pressure heat transfer medium, the air can be separated from the low pressure heat transfer medium in the liquid phase state in the receiver tank 4 and the separated air can be transported to the air storage tank 5 provided thereabove.

As a result, it is possible to prevent decrease in efficiency due to mixing of the air that does not contribute to heat transfer with the low pressure heat transfer medium and circulation of the air in the refrigeration system.

Figure 2:
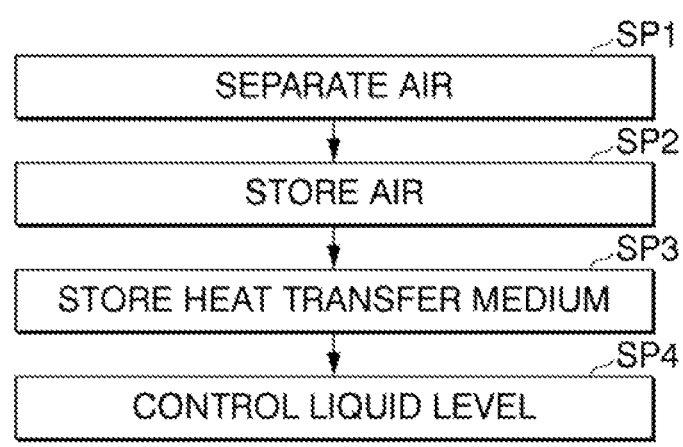
FIG. 2 is a process diagram showing a flow of processing performed by a cooling method according to the example of the minimum configuration of the present invention.

An example of a minimum configuration of the cooling method according to the present invention will be described with reference to FIG. 2.

This method is a cooling method for compressing a low pressure heat transfer medium in a gas phase state evaporated in a heat receiving unit and transporting the low pressure heat transfer medium to the condensation unit, and returning, to the heat receiving unit, the low pressure heat transfer medium condensed by the condensation unit such that it becomes a liquid phase state and flows into the receiver tank, and the method includes a process of the following steps SP1 to SP4.

Step SP1:
A process of separating air from a low pressure heat transfer medium by a receiver tank, which receives a low pressure heat transfer medium in any one of places of a flow path of the low pressure heat transfer medium in a gas phase state or a low pressure heat transfer medium in a liquid phase state.

Step SP2:
A process of introducing and storing the separated air.

Step SP3:
A process of storing a low pressure heat transfer medium that becomes a liquid phase state.

Step SP4:
A process of controlling a liquid level of a low pressure heat transfer medium at a height at which an inlet of a flow path through which a low pressure heat transfer medium stored in a liquid phase state is transported to the heat receiving unit can be liquid-sealed.

With the above-mentioned configuration, the air mixed with the low pressure heat transfer medium can be separated by step SP1 and the liquid level of the receiver tank is controlled to a predetermined height, and thus an outlet of the receiver tank is liquid-sealed and mixing of the air when the low pressure heat transfer medium in a liquid phase state is returned from the receiver tank to the heat receiving unit can be prevented.

As a result, it is possible to prevent a decrease in efficiency due to mixing of the air that does not contribute to heat transfer with the low pressure heat transfer medium and circulation of the air in the refrigeration system.

A first example embodiment of the present invention will be described with reference to FIG. 3.

Reference sign 100 designates an outdoor unit installed outdoors, and reference sign 200 designates an indoor unit installed indoors that becomes a target of air conditioning (cooling).

The outdoor unit 100 and the indoor unit 200 are connected by discharge pipes 311 and 312 and supply pipes 313 and 314, and configured such that a low pressure heat transfer medium circulates therethrough.

The indoor unit 200 includes heat receiving units (heat receivers) 220. Each of the heat receiving units 220 is configured by a heat exchanger (evaporator). The heat exchanger exchanges heat with the air through evaporation of the low pressure heat transfer medium. For example, the heat exchanger includes pipes, through which the low pressure heat transfer medium flows, and fins. The example of the indoor unit 200 shown in FIG. 3 is configured such that a plurality of heat receiving units 220 are connected in parallel between the supply pipe 314 and the discharge pipe 311, and the low pressure heat transfer medium that flows in from the supply pipe 314 and receives heat from the indoor air is discharged to the discharge pipe 311.

An expansion valve 210 configured to adjust a flow rate of the low pressure heat transfer medium supplied to the heat receiving units 220 is provided between the supply pipes 313 and 314.

A compressor 230 configured to compress the low pressure heat transfer medium discharged from the heat receiving units 220 is provided between the discharge pipes 311 and 312. The compressor 230 is configured to compress the low pressure heat transfer medium supplied from the discharge pipe 311 and discharge the low pressure heat transfer medium to the discharge pipe 312, and distribute the low pressure heat transfer medium to a plurality of condensation units (condensers) 140 from a branch pipe 316 provided at a tip of the discharge pipe 312.

In addition, some of the low pressure heat transfer medium distributed by the branch pipe 316 flows into an air storage tank 130 provided thereabove together with the air mixed with the low pressure heat transfer medium. The air is separated and stored in the air storage tank 130 due to the difference between densities of the low pressure heat transfer medium and the air while the low pressure heat transfer medium remains in the air storage tank 130 for a predetermined time. The air stored in the air storage tank 130 is discharged to the outside of the system of the refrigeration cycle by opening a valve 315a under a predetermined condition. It should be noted that instead of providing the valve 315a, the air storage tank 130 may be provided with an air-ventilation port that is opened when a predetermined amount of air or more has accumulated in the air storage tank 130.

Figure 3:
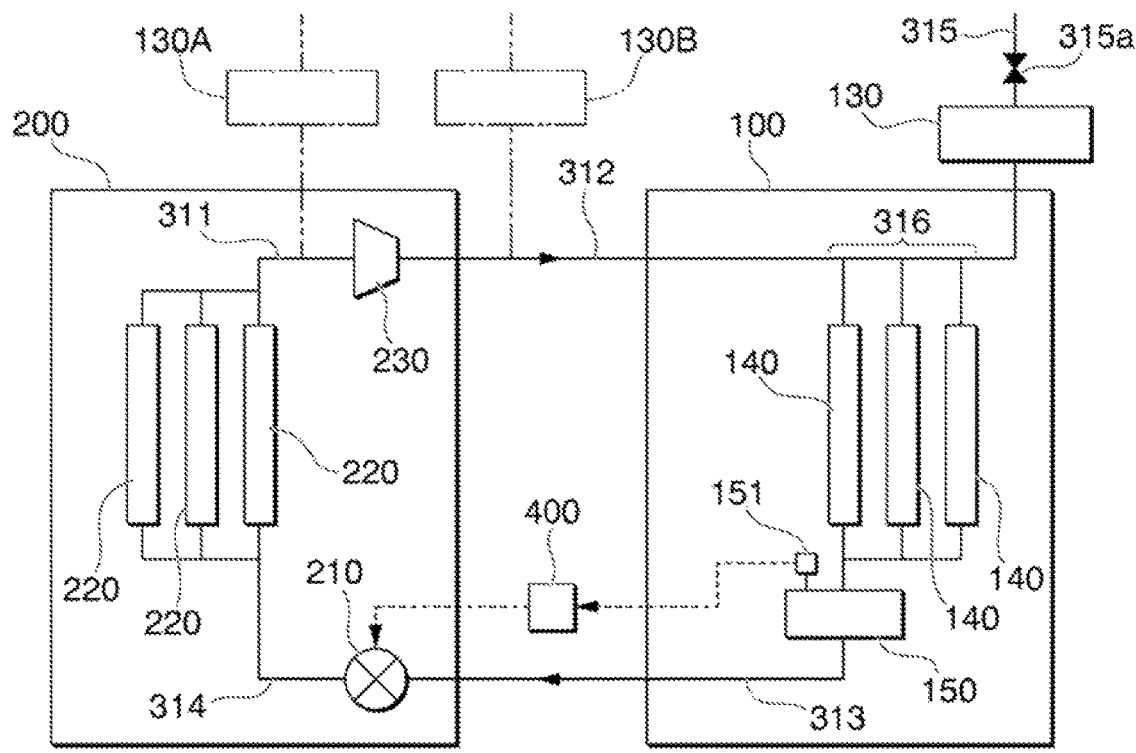
FIG. 3 is a pipeline system diagram showing a route, through which a low pressure heat transfer medium flows, in a cooling apparatus according to a first example embodiment of the present invention.

It should be noted that if air tends to remain at various places in the pipes depending on the routing state of the discharge pipes 311 and 312, for example, as shown by chain lines in FIG. 3, air storage tanks 130A and 130B may be added midway in the pipes, and the air remaining in these air storage tanks may be discharged by opening and closing the valves (not shown).

The air storage tank 130 stores the low pressure heat transfer medium supplied from the discharge pipe 312 and separates the low pressure heat transfer medium and the air mixed with the low pressure heat transfer medium using the difference between the densities thereof. The low pressure heat transfer medium with a high density flowing into the air storage tank 130 flows into the condensation units 140 provided therebelow and exchanges heat with the external air using heat exchangers that configure the condensation units 140. In addition, the air with a lower density than that of the low pressure heat transfer medium is separated from the low pressure heat transfer medium while being stored and remained in the air storage tank 130 for a predetermined time, flows into an exhaust pipe 315, and is discharged outside the system of the refrigeration cycle by opening the valve 315a in the middle of the exhaust pipe 315.

In the case of the example shown in FIG. 3, the plurality of condensation units 140 are provided, and these condensation units 140 are connected in parallel between the branch pipe 316 and the supply pipe 313.

A receiver tank 150 which receives the low pressure heat transfer medium that becomes a liquid phase state by radiating heat using the condensation units 140 is provided below the condensation units 140. The supply pipe 313 is connected to a bottom portion of the receiver tank 150.

The receiver tank 150 stores the low pressure heat transfer medium flowing from the condensation units 140 at a predetermined liquid level height, and includes a liquid level sensor 151 that detects the height of the liquid level. The liquid level sensor 151 supplies the measurement data of the liquid level to a calculation unit (calculator) 400. The calculation unit 400 controls the degree of opening of the expansion valve 210 between the supply pipe 313 and the supply pipe 314 in accordance with the measurement data of the liquid level supplied from the liquid level sensor 151. It should be noted that as a scheme for detecting the height of the liquid level using the liquid level sensor 151, any scheme capable of detecting the height of the liquid level may be employed, such as a scheme using reflection of ultrasonic waves, a scheme of detecting movement of a float that floats on the liquid surface and being displaced together with movement of the liquid surface, a scheme of detecting a phenomenon that a temperature inside the receiver tank 150 varies due to the liquid level of the low pressure heat transfer medium in the liquid phase state, or the like.

The calculation unit 400 lowers the liquid level in the receiver tank 150 by increasing the degree of opening of the expansion valve 210 to increase an amount of the low pressure heat transfer medium supplied to the heat receiving units 220, and raises the liquid level in the receiver tank 150 by decreasing the degree of opening of the expansion valve 210. Accordingly, the calculation unit 400 executes control of maintaining the liquid level of the low pressure heat transfer medium in the receiver tank 150 at a predetermined height.

In the air storage tank 130, the air mixed in the low pressure heat transfer medium is separated from the low pressure heat transfer medium due to the difference between the densities thereof and remains in the upper portion of the air storage tank 130 during storage over a predetermined time.

When the valve 315a in the normally closed state is temporarily opened, the air remaining in the upper portion of the air storage tank 130 can be discharged to the outside of the refrigeration cycle (referred to the outside of the system in which the low pressure heat transfer medium circulates).

Here, processing of drawing out the air in the air storage tank 130 by opening the valve 315a can be realized by, for example, an operation of measuring an accumulation amount of the air per a predetermined time (an amount of the air separated from the low pressure heat transfer medium and remaining in the air storage tank 130) in advance and opening the valve 315a over a predetermined time per each time estimated from the accumulation amount (the operation may be automatic control executed every regular intervals or may be performed manually).

In addition, the low pressure heat transfer medium remaining in the air storage tank 130 flows into the condensation units 140 provided therebelow, is condensed by heat exchange with the external air in the condensation units 140 to become a liquid phase state, and is dropped downward to flow into the receiver tank 150.

In the receiver tank 150, the calculation unit 400 controls the degree of opening of the expansion valve 210 on the basis of the measurement result of the liquid level sensor 151, and thus an outflow volume of the low pressure heat transfer medium from the receiver tank 150 to the supply pipe 313 is adjusted.

Figure 4:
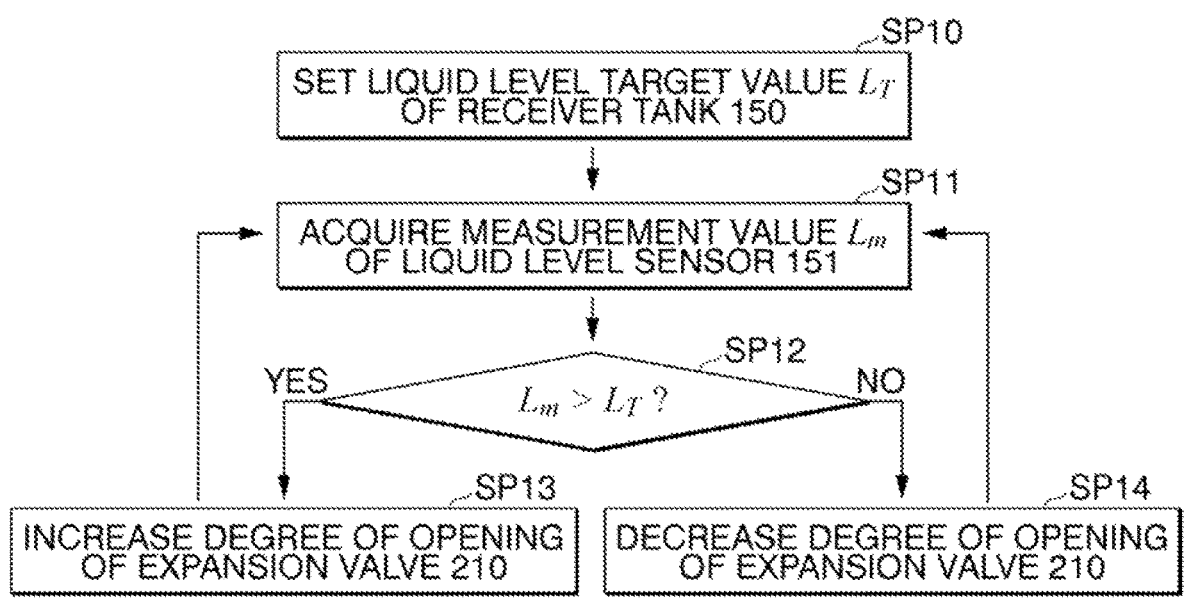
FIG. 4 is a flowchart of processing executed by a calculation unit of the cooling apparatus according to the first example embodiment.

That is, as shown in FIG. 4, the calculation unit 400 sets a liquid level target value $L_T$ of the receiver tank 150 in advance (step SP10), acquires a measurement value $L_m$ of the liquid level sensor 151 (step SP11), compares the liquid level target value $L_T$ with the measurement value $L_m$ (step SP12), and depending on the compared result, increases the degree of opening of the expansion valve 210 if the measurement value $L_m$>the liquid level target value $L_T$ is satisfied (step SP13) or decreases the degree of opening of the expansion valve 210 if the measurement value $L_m$>the liquid level target value $L_T$ is not satisfied (step SP14).

In this manner, by adjusting the degree of opening of the expansion valve 210 in accordance with the flow rate of the low pressure heat transfer medium flowing into the receiver tank 150 from the condensation units 140, the flow rate of the low pressure heat transfer medium flowing out of the receiver tank 150 to the supply pipe 313 is increased or decreased, so that the height of the liquid level of the low pressure heat transfer medium in the receiver tank 150 can be maintained at the liquid level target value $L_T$.

It should be noted that, for example, the liquid level target value $L_T$ is maintained at a value that guarantees an accumulation time large enough to separate the air from the low pressure heat transfer medium in the liquid phase state in the receiver tank 150, and the minimum of the liquid level target value $L_T$ is a height at which an opening of the supply pipe 313 connected to the bottom portion of the receiver tank 150 can always be liquid-sealed with the low pressure heat transfer medium in the liquid phase state.

A decrease in cooling efficiency can be prevented by controlling the liquid level in the receiver tank 150 so as to minimize mixing of the air with the low pressure heat transfer medium transported from the receiver tank 150 to the indoor unit 200 via the supply pipe 313.

It should be noted that a flowing-in position of the low pressure heat transfer medium flowing downward from the condensation units 140 to the receiver tank 150 (a position relative to the liquid level in the receiver tank 150) is set to a position lower than the liquid level target value $L_T$ in the receiver tank 150 (the pipe passes through the receiver tank 150, and the height of an outlet surface of the pipe is equal to or smaller than the liquid level target value $L_T$). Accordingly, a gas coolant in the receiver tank 150 does not flow back to the condensation units 140, and an example advantageous effect of preventing performance deterioration can be obtained. Furthermore, when a pipe route that allows the low pressure heat transfer medium to flow in from the lower surface of the receiver tank 150 is used, instead of a pipe route that allows the low pressure heat transfer medium to flow in from the upper portion of the receiver tank 150 as shown in FIG. 3, the liquid level target value $L_T$ needs only exceed 0 cm, and the same example advantageous effect can be obtained even when the liquid level height is lowered.

A second example embodiment of the present invention will be described with reference to FIG. 5 and FIG. 6. It should be noted that in FIG. 5 and FIG. 6, the same reference signs designate the same components as those in FIG. 3 and FIG. 4, and descriptions thereof will be omitted.

Figure 5:
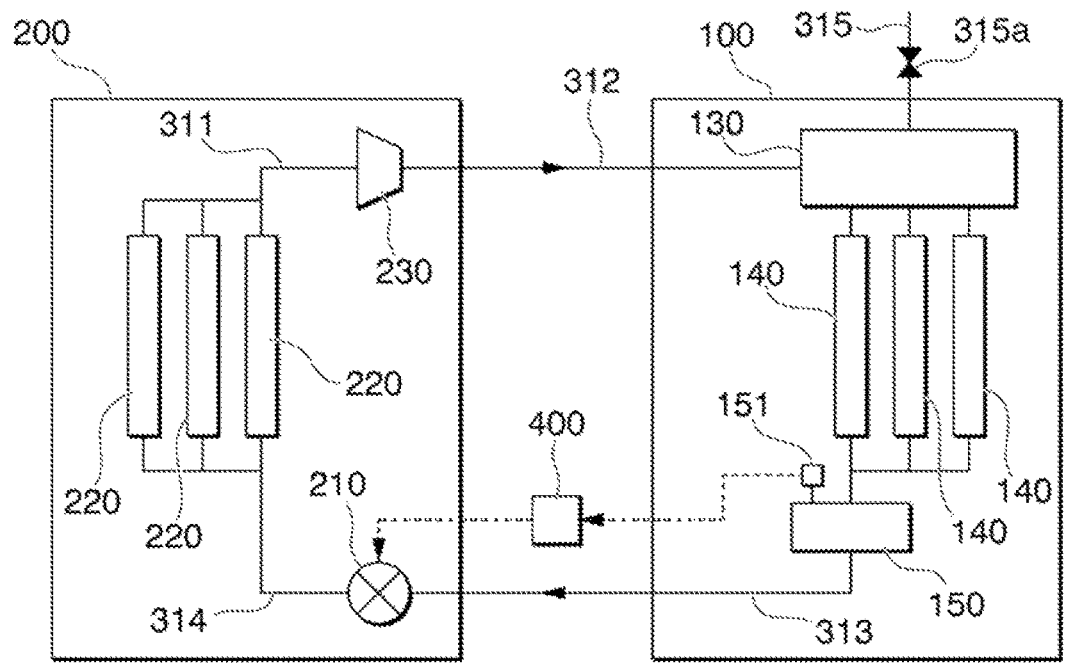
FIG. 5 is a pipeline system diagram showing a route, through which a low pressure heat transfer medium flows, in a cooling apparatus according to a second example embodiment of the present invention.
Figure 6:
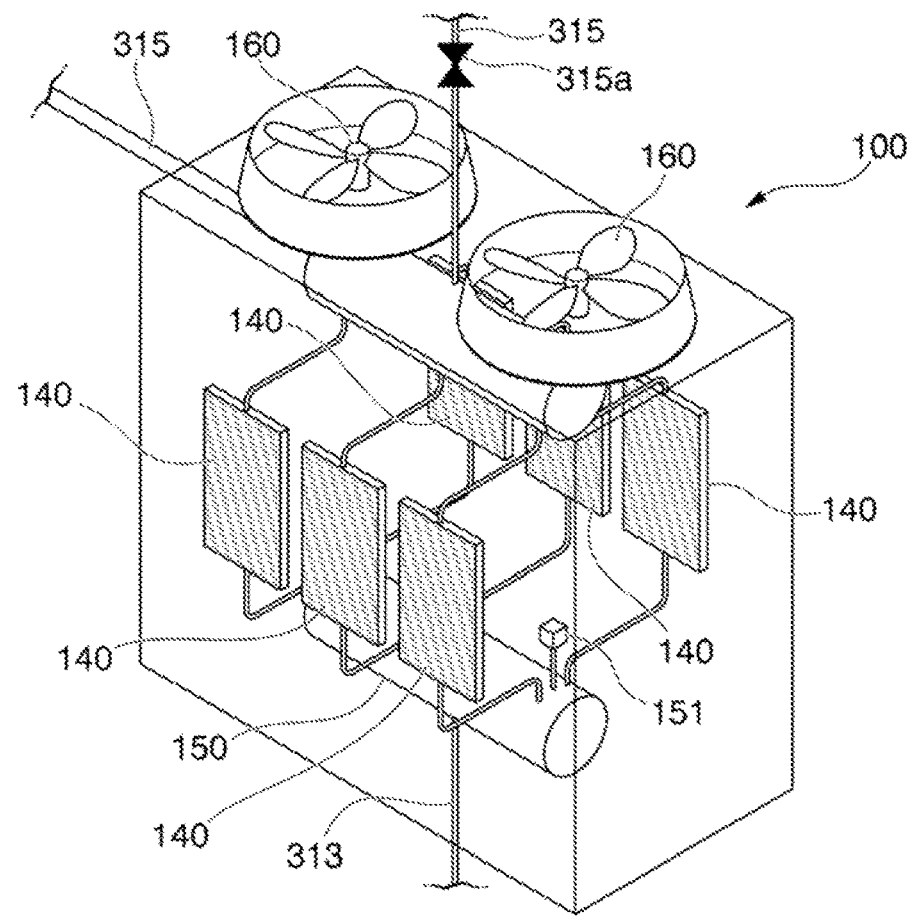
FIG. 6 is a diagram showing the details of an outdoor unit of the cooling apparatus according to the second example embodiment.

In the second example embodiment, as shown in FIG. 5, the branch pipe 316 is not provided, the discharge pipe 312 is connected to the condensation units 140 via the air storage tank 130, and the low pressure heat transfer medium is distributed to the condensation units 140 from the air storage tank 130.

The outdoor unit 100 will be described in detail with reference to FIG. 6.

A plurality of condensation units 140 are disposed between the air storage tank 130 provided thereabove and the receiver tank 150 provided therebelow. The plurality of condensation units 140 are connected to the air storage tank 130 and the receiver tank 150 in parallel.

Fans 160 are provided on the upper portion of the outdoor unit 100, and the outdoor unit 100 is configured such that these fans 160 discharge external air having a temperature increased through heat exchange with the condensation units 140 upward.

In the cooling apparatus configured as described above, the compressor 230 suctions the low pressure heat transfer medium that has absorbed heat in the heat receiving units 220 via the discharge pipe 311 and compresses the suctioned low pressure heat transfer medium. In addition, the compressor 230 transports the compressed low pressure heat transfer medium to the air storage tank 130 via the discharge pipe 312.

Even in the second example embodiment, the calculation unit 400 can lower the liquid level in the receiver tank 150 by increasing the degree of opening of the expansion valve 210 to increase an amount of the low pressure heat transfer medium supplied to the heat receiving units 220. In addition, the calculation unit 400 raises the liquid level in the receiver tank 150 by decreasing the degree of opening of the expansion valve 210. Accordingly, the calculation unit 400 executes control of maintaining the liquid level of the low pressure heat transfer medium in the receiver tank 150 at a predetermined height.

The liquid level in the receiver tank 150 is maintained at a predetermined level or more through such control by the calculation unit 400, and thus a decrease in cooling efficiency can be prevented by minimizing mixing of the air in the low pressure heat transfer medium supplied from the receiver tank 150 toward the indoor unit 200.

Figure 7:
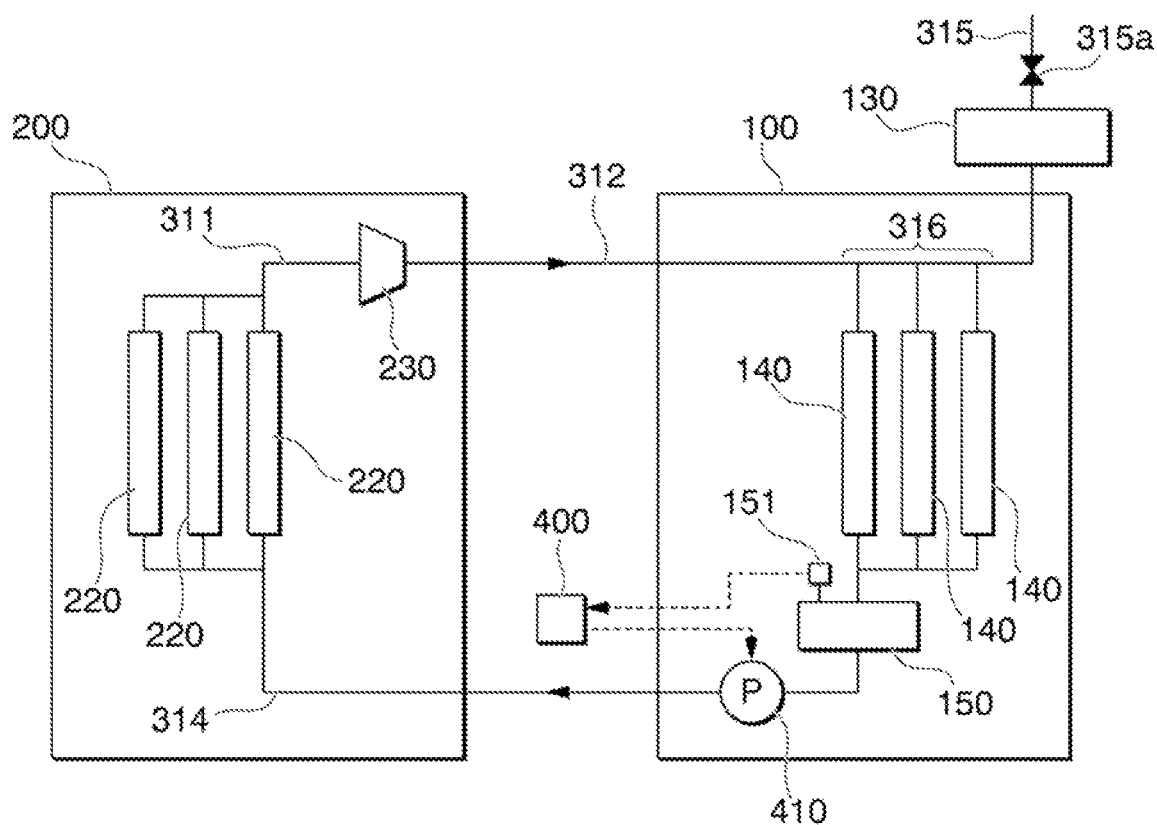
FIG. 7 is a pipeline system diagram showing a route, through which a low pressure heat transfer medium flows, in a cooling apparatus according to a third example embodiment of the present invention.

A third example embodiment of the present invention will be described with reference to FIG. 7. It should be noted that in FIG. 7, the same reference signs designate the same components as those in FIG. 3 to FIG. 6, and descriptions thereof will be omitted.

In the third example embodiment, instead of the liquid level control of the receiver tank 150 by controlling the expansion valve 210 by the calculation unit 400 according to the first example embodiment, a pump 410 is provided in the supply pipe 314, and a driving motor (not shown) of the pump 410 is controlled by the calculation unit 400 to increase and decrease the flow rate of the low pressure heat transfer medium supplied to the indoor unit 200. It should be noted that while the expansion valve is not shown in FIG. 7, the expansion valve may be provided in series with respect to the pump 410 in the middle of the supply pipe 313 or the supply pipe 314.

In the third example embodiment, the calculation unit 400 receives a liquid level measurement signal of the liquid level sensor 151 and executes control such that when the liquid level of the receiver tank 150 is lower than a set value of a lower limit, a flow rate (a discharge quantity) of the pump 410 is decreased, and when the liquid level of the receiver tank 150 is higher than a set value of an upper limit, a flow rate (a discharge quantity) of the pump 410 is increased. With this control, the liquid level in the receiver tank 150 is maintained at a predetermined level or more, and a decrease in cooling efficiency can be prevented by minimizing mixing of the air in the low pressure heat transfer medium toward the indoor unit 200.

It should be noted that instead of opening/closing control of the expansion valve 210 in the second example embodiment shown in FIG. 5, it is of course that the liquid level control of the receiver tank 150 is performed by control of a flow rate of the pump as in the third example embodiment.

Hereinabove, while the example embodiments of the present invention have been described in detail with reference to the accompanying drawings, the specific configurations are not limited to these example embodiments and design changes or the like may be made without departing from the gist of the present invention.

The present invention can be used in a cooling apparatus and a cooling method.

What is claimed is:

1. A cooling apparatus comprising:
   a heat receiver configured to evaporate a low pressure heat transfer medium;
   a compressor configured to compress the low pressure heat transfer medium in a gas phase state as evaporated by the heat receiver;
   a condenser configured to condense the low pressure heat transfer medium as compressed by the compressor;
   a receiver tank configured to receive and store the low pressure heat transfer medium in a liquid phase state as condensed by the condenser;
   an air storage tank configured to retain the low pressure heat transfer medium in the gas phase state, and to store air separated from the low pressure heat transfer medium—due to a difference between densities of the low pressure heat transfer medium and the air; and
   a liquid level controller configured to control a liquid level in the receiver tank such that the low pressure heat transfer medium in the liquid phase state is stored in the receiver tank at a predetermined liquid level height.

2. The cooling apparatus according to claim 1, wherein the predetermined liquid level height is a height at which an inlet of the flow path of the low pressure heat transfer medium from the receiver tank to the heat receiver is liquid-sealed.

3. The cooling apparatus according to claim 1, further comprising an expansion valve provided between the receiver tank and the heat receiver,
   wherein the liquid level controller controls the liquid level by adjusting a degree of opening of the expansion valve.

4. The cooling apparatus according to claim 1, further comprising a pump configured to transport the low pressure heat transfer medium in the liquid phase state from the receiver tank to the heat receiver,
   wherein the liquid level controller controls the liquid level by adjusting a discharge quantity of the pump.

5. The cooling apparatus according to claim 1, wherein the air storage tank includes an air-ventilation port that is opened when a predetermined amount or more of air accumulates.

6. The cooling apparatus according to claim 1, wherein the air storage tank is provided at a position above the condenser.

7. The cooling apparatus according to claim 1, wherein the air storage tank is configured to remain the low pressure heat transfer medium for a predetermined time.

8. The cooling apparatus according to claim 1, wherein the receiver tank has a pipe which receives the low pressure heat transfer medium, the pipe being set to a position lower than a liquid level in the receiver tank.

9. A cooling method comprising:
   compressing a low pressure heat transfer medium in a gas phase state evaporated by a heat receiver;
   condensing, by a condenser, the compressed low pressure heat transfer medium;
   retaining, by an air storage tank, the low pressure heat transfer medium in the gas phase state, and storing, by the air storage tank, air separated from the low pressure heat transfer medium due to a difference between densities of the low pressure heat transfer medium and the air;
   receiving and storing, by a receiver tank, the low pressure heat transfer medium in a liquid phase state as condensed by the condenser; and
   controlling a liquid level of the low pressure heat transfer medium in the receiver tank so as to be a height at which an inlet of the flow path through which the low pressure heat transfer medium stored in a liquid phase state is returned from the receiver tank to the heat receiver is liquid-sealed.

* * * * *